United States Patent
Yang et al.

(10) Patent No.: US 8,359,041 B2
(45) Date of Patent: Jan. 22, 2013

(54) SYSTEM AND METHOD FOR ADAPTIVELY CONTROLLING FEEDBACK INFORMATION

(75) Inventors: Yunsong Yang, San Diego, CA (US); Young Hoon Kwon, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 818 days.

(21) Appl. No.: 12/371,488

(22) Filed: Feb. 13, 2009

(65) Prior Publication Data

US 2009/0209264 A1 Aug. 20, 2009

Related U.S. Application Data

(60) Provisional application No. 61/029,285, filed on Feb. 15, 2008.

(51) Int. Cl.
*H04W 72/00* (2009.01)
(52) U.S. Cl. ......... 455/452.1; 455/69; 455/68; 455/453; 375/147; 375/141
(58) Field of Classification Search .......... 455/450–453, 455/68, 69; 375/140, 141, 147, E1.002
See application file for complete search history.

(56) References Cited

U.S. PATENT DOCUMENTS

| | | | |
|---|---|---|---|
| 2005/0181811 A1* | 8/2005 | Magnusson et al. | 455/458 |
| 2005/0192019 A1* | 9/2005 | Kim et al. | 455/452.1 |
| 2007/0177569 A1* | 8/2007 | Lundby | 370/349 |
| 2007/0189236 A1* | 8/2007 | Ranta-aho et al. | 370/335 |
| 2008/0187030 A1* | 8/2008 | Khan | 375/219 |
| 2008/0225822 A1* | 9/2008 | Zhang et al. | 370/343 |

* cited by examiner

*Primary Examiner* — Chuong A Ngo
(74) *Attorney, Agent, or Firm* — Slater & Matsil, L.L.P.

(57) ABSTRACT

A system and method for adaptively controlling feedback information according to a loading condition of a communications cell is provided. A method comprises receiving an indication from a base station, computing an amount of feedback information to transmit back to the base station using the indication, locating a feedback resource assigned to the mobile station using the amount of feedback information and an identity of the mobile station, computing a feedback information, and transmitting the feedback information using the located feedback resource. The indication is for a set of candidate transmission formats that is based on loading conditions in the cell.

26 Claims, 12 Drawing Sheets

SYSTEM AND METHOD FOR ADAPTIVELY CONTROLLING FEEDBACK INFORMATION

This application claims the benefit of U.S. Provisional Application No. 61/029,285, filed on Feb. 15, 2008, entitled "Adaptive Feedback Channel with Variable Information Length," which application is hereby incorporated herein by reference.

CROSS-REFERENCE TO RELATED APPLICATIONS

This application is related to U.S. patent application Ser. No. 12/353,182, entitled "Method and Apparatus for Transmitting in Multiple Antennas and Controlling Feedback Information," and filed Jan. 13, 2009, which patent application is incorporated herein by reference.

TECHNICAL FIELD

The present invention relates generally to wireless communications systems, and more particularly to a system and method for adaptively controlling feedback information according to a loading condition of a communications cell.

BACKGROUND

In beamforming, a wireless communications system focuses on forming directional transmission or reception signal power in the direction of a receiver or transmitter. Transmission and reception of wireless signals may benefit from beamforming due to the usually lower power needed to transmit wireless signals, which lessen interference to other receivers in the wireless communications system. Beamforming also benefits receivers by enhancing the desired received signal and lessens interference from other transmitters or signal sources. Typically, the stronger a formed beam capacity, the higher the signal quality at the receiver or transmitter.

Generally, in order for beamforming to operate properly, a mobile station (MS) may need to provide information to a base station (BS) feedback information, such as MS identification, beamforming coding matrix index, channel quality indicator, and so forth. The BS may utilize the feedback information received from the MS(s) to improve the performance of the wireless communications system.

However, the amount of feedback information received by the BS may be proportional to the number of communications channels between the BS and the MS. Furthermore, in a multi-user system, the amount of feedback information received by the BS from the multiple MS may be considerable. For example, dirty paper coding was contemplated to achieve a maximum capacity for the broadcasting channel. This approach, however, is complex and requires full channel status information which is prohibitive to be implemented in current state of the art systems. Closed-loop (multiple-input multiple-output) MIMO techniques with precoding matrix index feedback have been proposed and selected in current wireless communications standards. However, for such techniques the amount of feedback information required is proportional to the number of streams, which, in case of multiple users within a cell, is considerable. Opportunistic beamforming schemes have also been proposed to reduce the feedback amount. While the asymptotic performance of opportunistic beamforming approaches close to that with full channel state information (CSI) feedback as the number of users increases, the performance degrades significantly when there is a small number of users.

SUMMARY OF THE INVENTION

These and other problems are generally solved or circumvented, and technical advantages are generally achieved, by embodiments of a system and a method for adaptively controlling feedback information according to a loading condition of a communications cell.

In accordance with an embodiment, a method for operating a mobile station in a cell of a wireless communication system is provided. The method includes receiving an indication from a base station, computing an amount of feedback information to transmit back to the base station, locating a feedback resource assigned to the mobile station, computing feedback information, and transmitting the feedback information using the located feedback resource. The indication includes information related to a set of candidate transmission formats and a size of the set, and the size of the set is based on loading conditions in the cell, the computing an amount of feedback information is based on the indication, and the location of the feedback resource is based on the amount of feedback information and an identity of the mobile station. The feedback information is related to a preferred transmission format that is selected from the set of candidate transmission formats.

In accordance with another embodiment, a mobile station operating in a cell of a wireless communications system having a base station and a mobile station is provided. The mobile station includes means for receiving an indication from the base station, means for computing an amount of feedback information to transmit back to the base station based on the indication, means for locating a feedback resource assigned to the mobile station based on the amount of feedback information and an identity of the mobile station, means for computing a feedback information, and means for transmitting the feedback information using the located feedback resource. The indication includes information related to a set of candidate transmission formats for transmitting a data packet from the base station to the mobile station and a size of the set, and the indication is based on loading conditions in the cell. The feedback information is related to a preferred transmission format that is selected from the set of candidate transmission formats.

In accordance with another embodiment, a method for operating a base station in a cell of a wireless communications system is provided. The method includes computing a loading condition in the cell, selecting a set of candidate transmission formats for transmitting information, and transmitting an indication of the set of candidate transmission formats and a size of the set to a mobile station in the cell. The method also includes computing an expected amount of feedback information transmitted by the mobile station, locating a feedback resource for the mobile station, and receiving feedback information from the mobile station. The method further includes selecting a transmission format from the set of candidate transmission formats, and transmitting information to the mobile station using the selected transmission format. The selecting a set of candidate transmission formats is based on the loading condition, the expected amount of feedback information is based on the indication, and the feedback resource is located using an identifier of the mobile station and the expected amount of feedback information. The selecting a transmission format from the set of candidate transmission formats is based on the feedback information.

In accordance with another embodiment, a base station operating in a cell of a wireless communications system, wherein the wireless communications system comprises a base station and a mobile station, is provided. The base station includes means for determining a loading condition in the cell, means for selecting a set of candidate transmission formats for transmitting a data packet to the mobile station based on the loading condition in the cell, means for indicating the set of candidate transmission formats to the mobile station, means for computing an amount of feedback information that the mobile station transmits back based on the set of candidate transmission formats, means for locating a feedback resource that the mobile station uses for transmitting the feedback information based on the amount of feedback information and an identity of the mobile station, means for receiving feedback information using the feedback resource, means for selecting a transmission format from the set of candidate transmission formats using the feedback information, and means for transmitting the data packet according to the selected transmission format.

In accordance with another embodiment, a circuit is provided. The circuit includes a feedback controller that computes a first sequence index, a second sequence index, and a feedback index from an identifier of a mobile station and feedback information to be transmitted by the mobile station, a first sequence generator coupled to the feedback controller, a resource mapper coupled to the first sequence generator, a second sequence generator coupled to the feedback controller, and a domain converter coupled to the resource mapper. The first sequence generator generates an orthogonal sequence based on the first sequence index, and the resource mapper maps an output of the first sequence generator onto frequency sub-carriers based on the feedback index. The second sequence generator generates a second sequence based on the second sequence index, and the domain converter converts a frequency domain signal produced by the resource mapper into a time domain signal.

An advantage of an embodiment is the amount of feedback information per user may decrease as the number of users increases. This may result in a net total amount of feedback information remaining relatively constant, independent of the number of users in the wireless communications system.

A further advantage of an embodiment is that as the BS changes its beamforming coefficient set, the MS may be able to rapidly provide feedback information, notifying the BS of the impact of its changes.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless code division multiplexed-orthogonal frequency division multiple access (CDM-OFDMA) communications system that makes use of opportunistic beamforming to improve overall system performance. The invention may also be applied, however, to other wireless communications systems that make use of opportunistic beamforming, such as OFDMA communications systems. Furthermore, the invention may be applied to frequency division duplex (FDD) or time division duplex (TDD) communications systems.

Opportunistic beamforming (BF) can be regarded as a special case of a preceding matrix feedback scheme that uses only one preceding matrix set for a specific time, with the preceding matrix set varying (potentially randomly) in different time slots. Because there is only one preceding matrix set at a time, it is not necessary for each user to feedback the index of the preceding matrix. Rather, each user needs to only feedback a channel quality indicator (CQI) for the given preceding matrix set (however in the case of multiple streams, each user should also feedback a stream index along with CQI). When there are numerous users within a cell, the performance of opportunistic BF with multiple streams approaches that of coherent BF.

In the co-assigned U.S. patent application Ser. No. 12/353,182, a method for adaptively changing the number of candidate beam sets (preceding matrix sets) and beam streams at specified times according to loading conditions of the cell (e.g., the number of beamforming-enabled MS being served in the cell) is disclosed. A plurality of beam sets and the beam streams are pre-defined and are known to both the BS and the MS, referenced by respective indices, with only a subset of the pre-defined beam sets being available as candidates for transmission to any MS at a specific scheduled time.

Figure 1A:
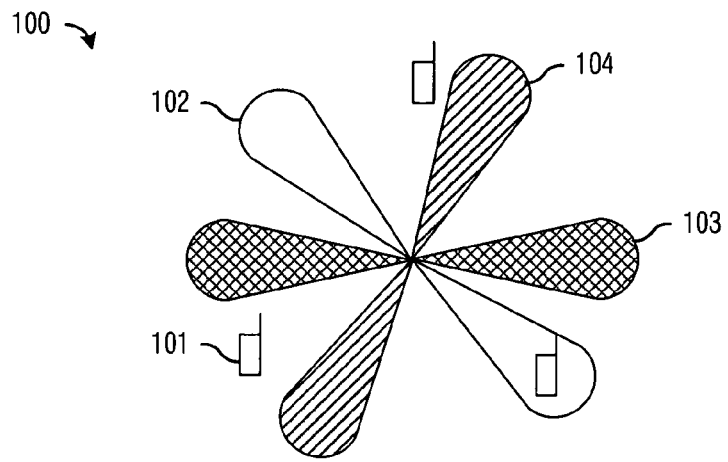
FIG. 1a is a diagram of a wireless communications system, wherein there are only a few beamforming-enabled mobile stations in a cell.

FIG. 1a is a diagram illustrating a cell 100 of a wireless communications system, wherein there are only a few beamforming-enabled MSs 101 in cell 100. To increase a probability that a MS 101 may find a candidate beam stream suitable for its channel condition, three candidate beam sets 102, 103, and 104, are provided by a BS at a particular time, with each candidate beam set 102-104 including two candidate beam streams.

Figure 1B:
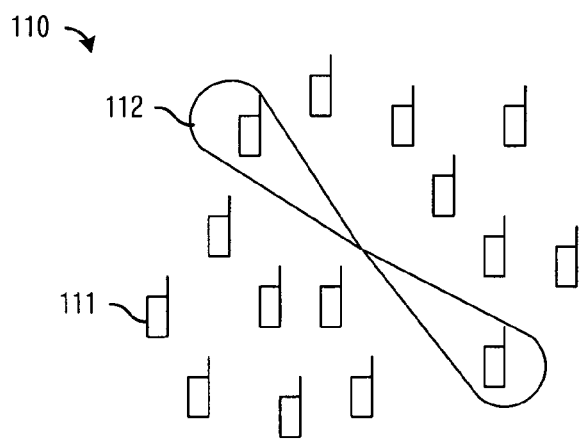
FIG. 1b is a diagram of a wireless communications system, wherein there is a large number of beamforming-enabled mobile stations in a cell

FIG. 1b is a diagram illustrating a cell 110 of a wireless communications system where there is a large number of beamforming-enabled MS 111 in cell 110. A BS provides only one candidate beam set 112 at a particular time, wherein the candidate beam set 112 includes two candidate beam streams. Because of the multi-user scheduling gain of the large number of MS, it is almost ensured that at least one beamforming-enabled MS 111 can find a candidate beam stream that is suitable for its channel condition. As shown in FIG. 1b, system potential capacity may be approximated even with a very small number of candidate beam streams.

Typically, the BS transmits a common pilot signal that is not beamformed. The BS also transmits feedforward information. The feedforward information may explicitly include the indices of the candidate beam sets and the beam streams per beam set for the next scheduling period. Alternatively, the feedforward information may include the number of candidate beam sets and the number of beam streams per beam set such that the BS and the MS may use certain pseudorandom mapping rules to derive the exact indices of the candidate beam sets and the beam streams per beam set for the next scheduling period. The number of candidate beam sets at a specific scheduling time may be adjusted adaptively according to loading conditions in the cell, such as the number of beamforming-enabled MS within the cell, the buffer status of these MS, and so forth.

The amount of information that the MS needs to feedback to the BS regarding its selection and indication of the preferred candidate beam stream may be changed based on the cell's loading condition of beamforming-enabled MS and their buffer status. For example, each beamforming-enabled MS 101 in FIG. 1a may need to feedback a three-bit beamforming index (BFI) to indicate the index of the preferred preceding matrix that the MS wants the BS to transmit using (three beam sets with two beam streams per set), while each beamforming-enabled MS 111 in FIG. 1b needs to feedback a one-bit BFI to indicate the index of the preferred preceding matrix (one beam set with two beam streams per set).

Clearly, the total amount of beamforming feedback information needed, which is a total number of MS that sends the beamforming feedback information multiplied by the number of BFI information bits transmitted by each MS, remains relatively constant or at least grows at a less than linear rate as the number of MS increases.

Current technical standards, such as the high speed packet access (HSPA) and long term evolution (LTE) standards developed by the third generation partnership project (3GPP), the ultra mobile broadband (UMB) standard developed by the third generation partnership project two (3GPP2), and the IEEE 802.16e standard developed by IEEE 802.16 working group all use beamforming techniques and all used a fixed amount of beamforming feedback given a particular number of antennas used at the BS. The amount of beamforming feedback may vary for different number of BS antennas. For example, a larger precoding matrix may be used for a larger number of BS antennas since the beams may be made narrower with a larger number of antennas. However, the amount of feedback information is either independent of the cell loading or a considerable amount of explicit signaling with attendant overhead from the BS is required to change the amount of feedback information provided by each MS. Therefore, the total amount of beamforming feedback that the BS receives may grow linearly with the number of beamforming-enabled MS served in the cell of the wireless communications system.

The feedforward information, which the BS sends to indicate either the indices of the candidate beam sets and the beam streams per beam set or the number of candidate beam sets and the number of beam streams per beam set for the next scheduling period, may also be used by the BS and the MS to determine the amount of BFI feedback (in number of bits) sent from each MS to the BS. Then, based on the number of BFI feedback bits, the BS and the MS may determine a modulation and coding scheme, a time domain resource, a frequency domain resource, a code domain resource, or any combination thereof, to be used. The code domain resource includes orthogonal or quasi-orthogonal codes that may be spread in the time domain or frequency domain or both. The code domain resource may further include the interleaving pattern and/or the scrambling code applied in the time domain or frequency domain or both. There may be no need for any other form of dynamic signaling from the BS.

The time domain resources and the frequency domain resources assigned to each beamforming-enable MS for sending BFI feedback information may be fixed and non-overlapping with time domain and frequency domain resources assigned to any other MS within the same cell. If the number of BFI information bits changes (as indicated by the BS, for example), the modulation and coding scheme used on each BFI feedback is changed accordingly so that the same bandwidth (time domain and frequency domain resources) is still occupied. The transmission power of the transmission waveform or the transmission power density on each OFDMA sub-carrier used to send the feedback information may be adjusted by the MS accordingly. For example, if the number of BFI information bits is reduced, the MS may use a lower coding rate, which may mean better coding protection. As a result, the MS may also use lower transmit power to transmit the BFI feedback. The overhead savings may not come directly from a reduction in the bandwidth used to send the BFI feedback, but rather indirectly from the lower transmission power used to send the BFI feedback. This may result in a lower interference generated to other MS, cells, etc., thereby producing a smaller number of re-transmissions and an improvement in capacity.

Figure 2A:
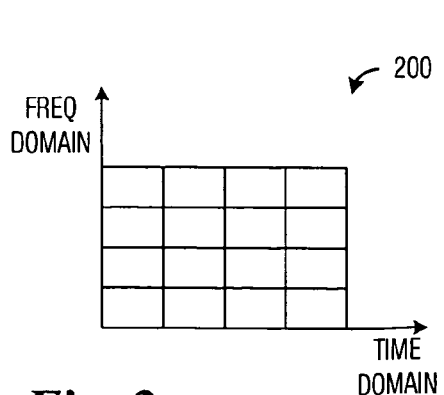
FIG. 2a is a diagram of a time and frequency domain resource.
Figure 2B:
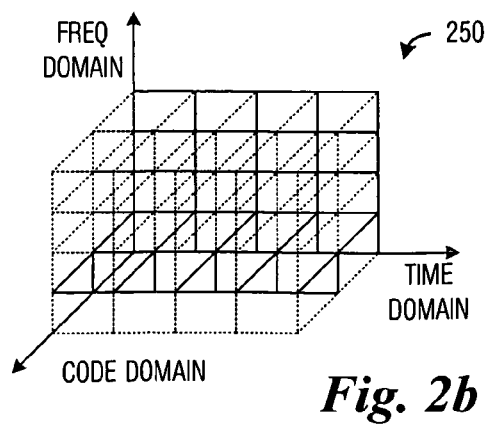
FIG. 2b is a diagram of a time, frequency, and code domain resource.

FIG. 2a is a diagram illustrating a time and frequency domain resource 200 that may be used for sending BFI feedback, with time domain resources shown along a horizontal axis and frequency domain resources shown along a vertical axis. FIG. 2b is a diagram illustrating time, frequency, and code domain resources 250 may also be used for sending BFI feedback. The code domain resources are shown along an axis orthogonal to both the horizontal and vertical axes.

Figure 3:
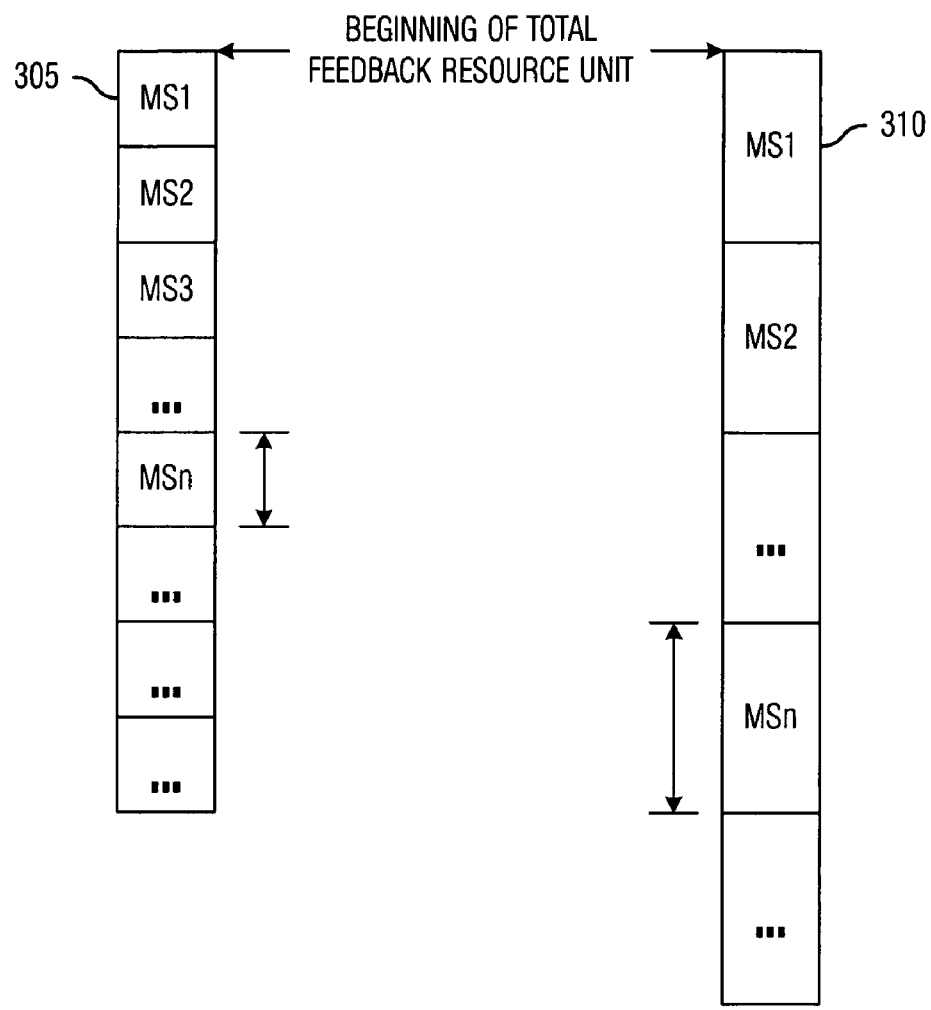
FIG. 3 is a diagram of logical feedback resource units.

As discussed above, the time and/or frequency domain resources assigned to each beamforming-enabled MS for sending BFI feedback may not overlapping with any other mobile stations within the same cell, and may be adjustable according to the loading condition of the cell. FIG. 3 is a diagram illustrating logical feedback resources units, such as logical feedback resource unit 305 and logical feedback resource unit 310, used by each MS to send BFI feedback. Logical feedback resource unit 310 may correspond to twice the bandwidth of logical feedback resource unit 305, in order to allow for the transmission of more BFI feedback bits. The BS may indicate the beginning point of the total resource used for BFI feedback to all the MS (shown in FIG. 3 as a point at a beginning of logical feedback resource unit 305 and logical feedback resource unit 310).

Each MS may be identified by an identity (ID), such as a media access control identifier (MACID), which may begin from zero (0) and go up to a total number of MS. In general, the BS may make use of tight packing, wherein it will assign a lowest unused ID value to a MS, i.e., there are no unused ID values lower than the assigned ID value being assigned to a MS. Tight packing may reduce the chance of having holes in the feedback resources. As shown in FIG. 3, logical feedback resource unit 305 may be a single bit feedback resource unit assigned to a MS with ID=1 and logical feedback resource unit 310 may be a double bit feedback resource unit assigned to a MS with ID=1.

Each MS may then determine (compute) the logical feedback resource unit that it has been assigned to send its BFI feedback using its ID value. Each MS may also make use of the about of BFI feedback information to determine the logical feedback resources that it has been assigned, with the amount of BFI feedback information being indicated in feed-forward information provided by the BS. For example, if a MS determines that its BFI feedback information is one (1) bit long, then a single feedback resource unit may be used. The MS may determine a beginning point of its feedback resource unit using an expression expressible as:

beginning point=feedback resource unit starting point+(N−1)*size of feedback resource unit, and an ending point of its feedback resource unit using an expression expressible as:

ending point=feedback resource unit starting point+ (N)*size of feedback resource unit, where feedback resource unit starting point is the starting point of time and/or frequency domain resources allocated for use in transmitting BFI feedback, N is the ID assigned to the MS, and size of feedback resource unit is the number of bits in the BFI feedback.

For example, if the MS determines that its BFI feedback information is one bit long, then it may use feedback resource unit starting point and size of feedback resource unit corresponding to feedback resource units for use in transmitting single bit BFI feedback, such as logical feedback resource unit 305. While, if the MS determines that its BFI feedback information is two bits long, then it may use feedback resource unit starting point and size of feedback resource unit corresponding to feedback resource units for use in transmitting double bit BFI feedback, such as logical feedback resource unit 310.

The MS may then use the located feedback resource unit to send its BFI feedback to the BS. Bandwidth savings may be achieved in the cell. The above discussion does not consider the use of a mapping scheme between a logical feedback resource unit and an actual physical resource. If desired, a mapping scheme between logical feedback resource units and actual physical resource may be used. Therefore, the lack of discussion of a mapping scheme should not be construed as being limiting to either the scope or the spirit of the embodiments.

Alternatively, the time and/or frequency domain resources assigned to each beamforming-enabled MS for transmitting BFI feedback may be shared among a number of MS in a single cell. Sharing may be enabled through the use of different orthogonal or quasi-orthogonal spreading sequences, such as in a CDM-OFDMA wireless communications system. The number of spreading sequences and the range of the spreading sequences that are assigned to each MS may be changed dynamically according to the loading condition of the cell. The MS may determine the number of sequences and the exact indices of the spreading sequences assigned to it for use in transmitting the BFI feedback based on its ID and the length of the BFI feedback that it needs to transmit. The MS may select one spreading sequence out of a range of spreading sequences assigned to it according to the value of the BFI feedback that it wishes to transmit.

Figure 4:
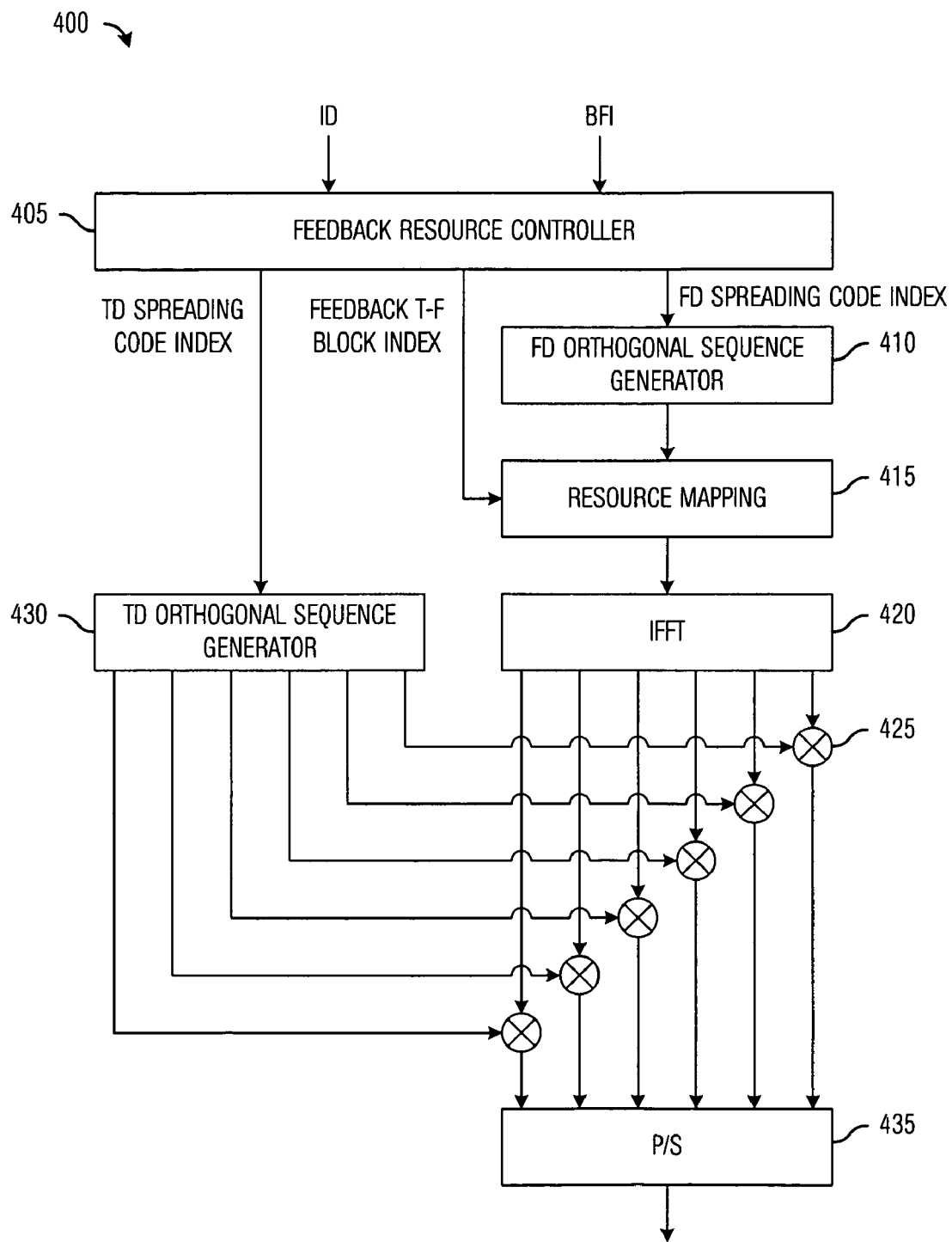
FIG. 4 is a diagram of a system for use in modulating and encoding beamforming index (BFI) feedback information for transmission to a BS.

FIG. 4 is a diagram illustrating a system 400 for use in modulating and encoding BFI feedback information for transmission to a BS. System 400 makes use of an orthogonal or quasi-orthogonal sequence applied in the frequency domain, an inverse Fourier transform, such as an inverse Fast Fourier Transform (IFFT) operation, and additional spreading with an orthogonal cover code in the time domain to modulate and encode the BFI feedback information. The BS may define one or more basic feedback time-frequency resource block(s), or simply feedback resource block(s), with each covering a first number (N1) of frequency sub-carriers in frequency and a second number (N2) of OFDM symbols in time. Additionally, the BS may define a third number (N3) of orthogonal codes that may be spread with good orthogonal properties in the frequency domain for a given value of N1, and a fourth number (N4) of orthogonal codes that may be spread with good orthogonal properties in the time domain for a given value of N2.

The orthogonal codes in the time domain may be Walsh codes if N2 is a power of two (2). The orthogonal codes in the time domain may be a Fourier matrix if N2 is not a power of two (2). Therefore, if the orthogonal codes in the time domain are either Walsh codes or the Fourier matrix, N2 and N4 may have the same value. The total number of orthogonal sequences that may be spread over the entire basic feedback time-frequency resource block with good orthogonal properties may be equal to N3×N4.

System 400 includes a feedback resource controller 405 that may be used to compute a feedback time-frequency block index, a time domain (TD) spreading code index, and a frequency domain (FD) spreading code index. Feedback resource controller 405 may make use of the knowledge of the number of BFI information bits (denoted N_BFI) that may be required and the values of a MS's ID and BFI feedback (wherein BFI=0, . . . , $2^{N\_BFI}-1$) as follows:

$$FeedbackTimeFrequencyBlockIndex = \text{floor}\left(\frac{ID \times 2^{N\_BFI} + BFI}{N3 \times N4}\right) \quad (1)$$

$$TDSpreadCodeIndex = \text{floor}\left(\frac{mod(ID \times 2^{N\_BFI} + BFI, N3 \times N4)}{N3}\right) \quad (2)$$

$$FDSpreadCodeIndex = mod(mod(ID \times 2^{N\_BFI} + BFI, N3 \times N4), N3), \quad (3)$$

where floor( ) denotes the function of rounding towards the negative infinity, mod(x,y) denotes the modulus function after x is divided by y. In an alternative method of computation, equation (1) can be used together with the following equations to compute the feedback time-frequency block index, the time domain (TD) spreading code index, and the frequency domain (FD) spreading code index:

$$TDSpreadCodeIndex = mod(mod(ID \times 2^{N\_BFI} + BFI, N3 \times N4), N4) \quad (4)$$

$$FDSpreadCodeIndex = \text{floor}\left(\frac{mod(ID \times 2^{N\_BFI} + BFI, N3 \times N4)}{N4}\right). \quad (5)$$

A FD orthogonal sequence generator 410 may then generate the orthogonal sequence in the frequency domain from the FD spreading code index. FD orthogonal sequence generator 410 may further include a sequence index randomizer that may map the same FD spreading code index into different orthogonal sequences for different OFDM symbols. If severe frequency-selective fading is encountered and the orthogonality between the orthogonal sequences in the frequency domain is compromised, the orthogonal sequences used by a first MS may not be interfered with by a second MS in the same manner in each of the N4 number of OFDM symbols. The interference may therefore be randomized, yielding better expected performance.

A resource mapping element 415 may then map the output orthogonal sequences from FD orthogonal sequence generator 410 onto the frequency sub-carriers based on the feedback time-frequency block index. An IFFT element 420 may perform the IFFT operation to generate time domain waveforms over the N2 number of OFDM symbols.

A plurality of multipliers, such as multiplier 425, may multiply the time domain waveforms of each OFDM symbol (from IFFT element 420) with one element of the time domain orthogonal spreading code that are generated by a TD orthogonal sequence generator 430 from the TD spreading code index. A parallel-to-serial converter 435 may then convert the parallel signal into a serial signal. Additional circuitry, typically present in an OFDMA system, such as adding a cycle prefix, windowing, up-converting the baseband signal onto a radio frequency signal, and so forth, may be omitted in order to maintain simplicity in FIG. 4.

The orthogonal sequences used in the frequency domain may be a set of constant amplitude and zero auto-correlation codes (CAZAC) or computer generated codes with desired properties, such as, low peak-to-average power ratio (PAPR) and good auto-correlation and cross-correlation properties. A set of such codes may consist of a plurality of cyclic shifted versions of the same base code of one CAZAC code or a computer generated code. In this case, the FD spreading code index is the index of the cyclic shifts. The orthogonal sequences used in the frequency domain may also be a set of Walsh codes. A disadvantage of using Walsh codes in the frequency domain may be their higher PAPR in the time domain waveforms.

Figure 5:
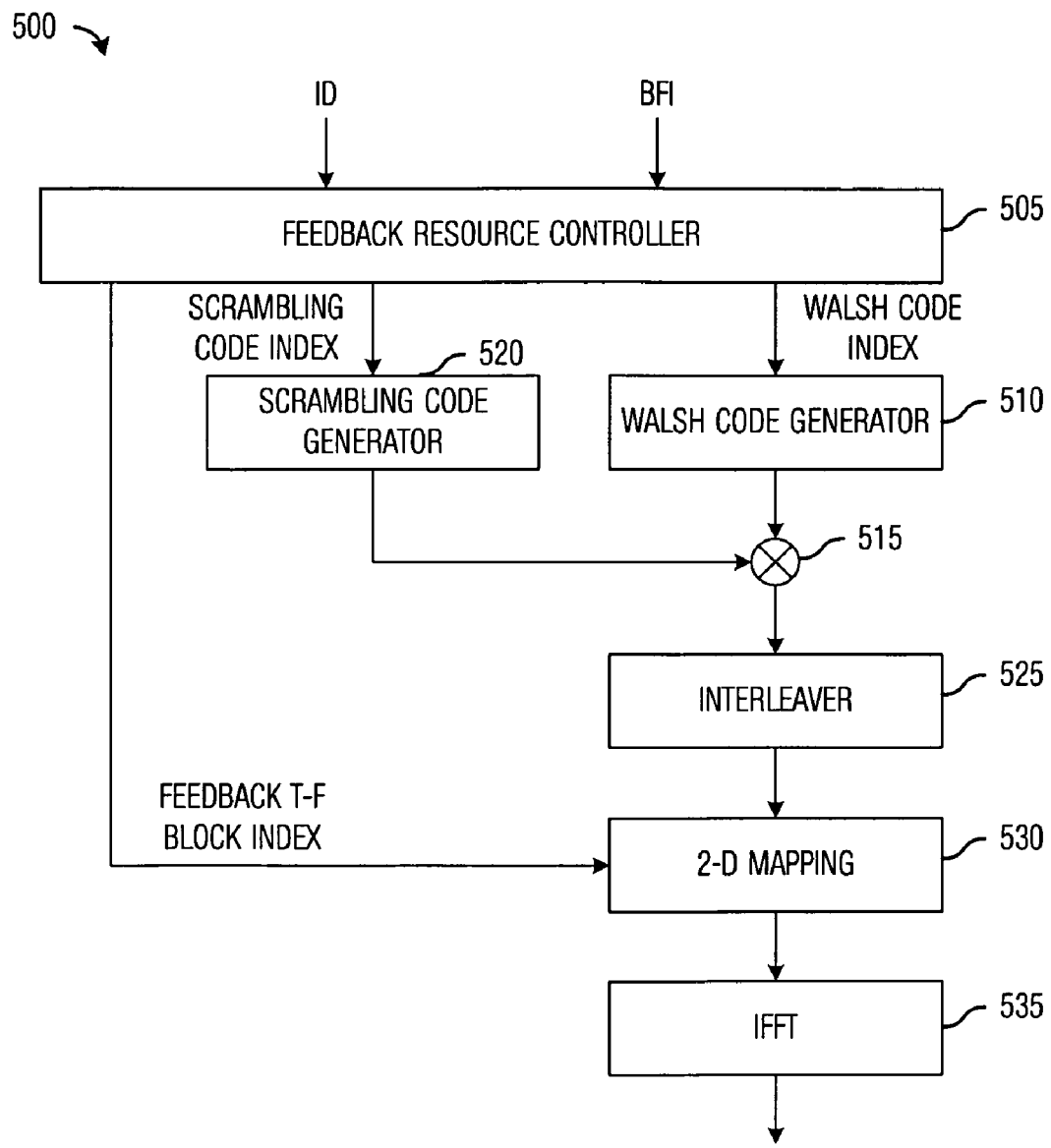
FIG. 5 is a diagram of a system for use in modulating and encoding beamforming index (BFI) feedback information for transmission to a BS.

FIG. 5 is a diagram illustrating a system 500 for use in modulating and encoding BFI feedback information for transmission to a BS. System 500 makes use of an orthogonal or quasi-orthogonal sequence that may be spread over the two-dimensions of a basic feedback time-frequency resource block prior to an IFFT operation. The orthogonal sequences may be Walsh codes. A Walsh length of the Walsh codes (Nw) that may fit into the basic feedback time-frequency resource block may be equal to $2^{floor(log2(N1 \times N2))}$. Therefore, it may be more efficient to choose N1 and N2 such that N1×N2 is a power of two multiple of an integer number.

System 500 includes a feedback resource controller 505 that may be used to compute a feedback time-frequency block index and a Walsh code index. Feedback resource controller 505 may also be used to compute a scrambling code index. Feedback resource controller may make use of a number of BFI information bits required and a MS' ID and BFI feedback. The computations may be expressed as:

$$FeedbackTimeFrequencyBlockIndex = \text{floor}\left(\frac{ID \times 2^{N\_BFI} + BFI}{Nw \times Ns}\right) \quad (6)$$

$$ScramblingCodeIndex = \text{floor}\left(\frac{mod(ID \times 2^{N\_BFI} + BFI, Nw \times Ns)}{Nw}\right) \quad (7)$$

$$WalshCodeIndex = mod(mod(ID \times 2^{N\_BFI} + BFI, Nw \times Ns), Nw), \quad (8)$$

where Ns denotes the number of scrambling codes that may be used simultaneously on one basic feedback time-frequency resource block.

A Walsh code generator 510 may then generate a Walsh code based on the Walsh code index. The Walsh code may be further scrambled with a scrambling code and multiplier 515. The scrambling code may be generated by scrambling code generator 520 from the scrambling code index. The scrambling code may be used primarily to reduce the PAPR of the waveform. In order to maintain the orthogonality between the Walsh codes, only one scrambling code should be used on each basic feedback time-frequency resource block (i.e., Ns=1). However, in a situation with limited bandwidth, using different scrambling codes over the Walsh codes may create more quasi-orthogonal codes in order to provide additional signaling space for the feedback channel. This may come at the expense of interference, however.

An interleaver 525 may further interleave the scrambled output sequence to improve the decoding performance under high mobility. A two-dimensional mapping element 530 may map the interleaved output sequence onto the frequency sub-carriers across the entire basic frequency time-frequency resource block from the feedback time-frequency resource block index. An IFFT element 535 may perform an IFFT operation to generate time domain waveforms.

Figure 6:
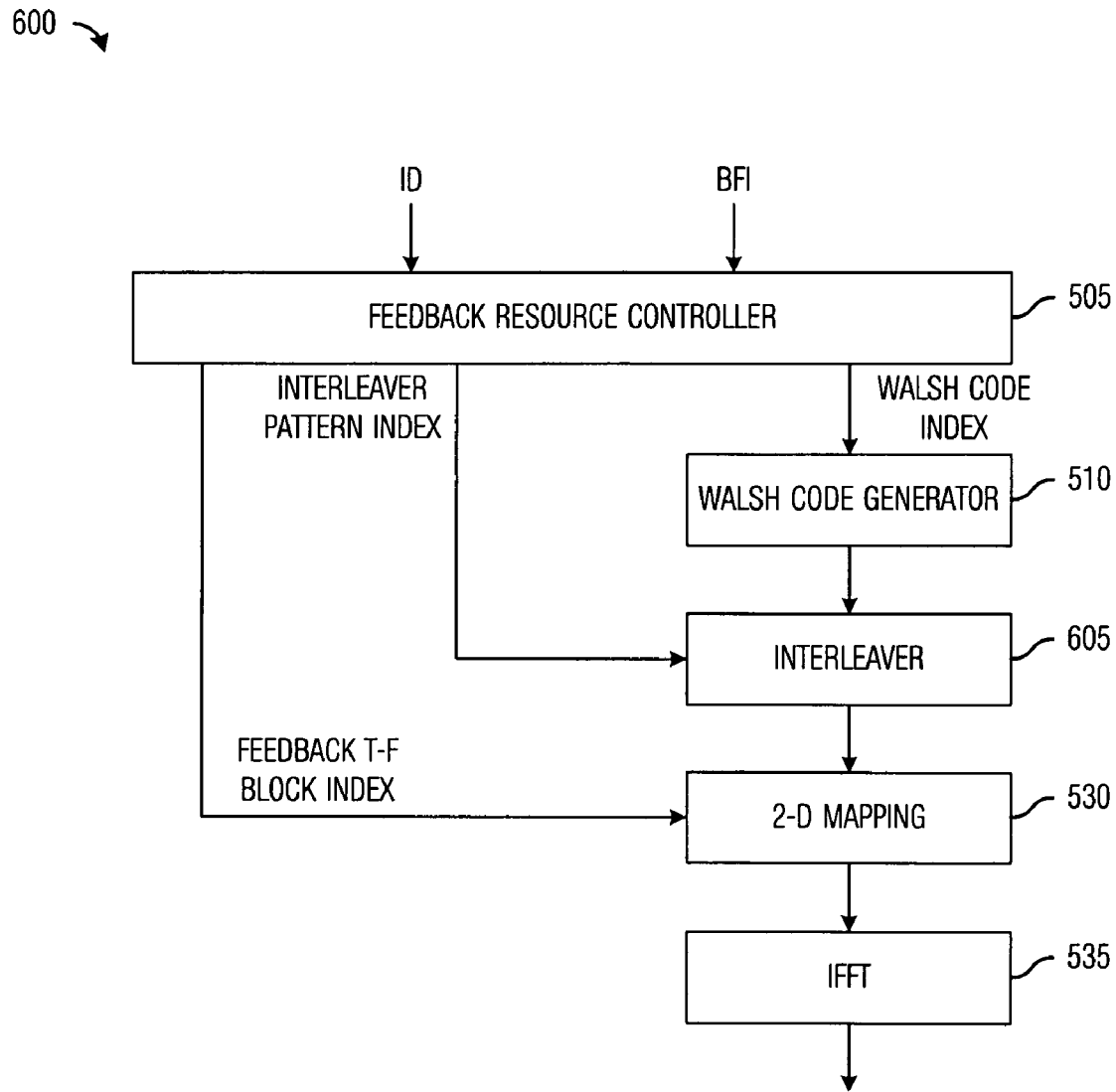
FIG. 6 is a diagram of a system for use in modulating and encoding beamforming index (BFI) feedback information for transmission to a BS.

FIG. 6 is a diagram of a system 600 for use in modulating and encoding BFI feedback information for transmission to a BS. System 600 includes an interleaver 605 that may be used to reduce the PAPR of the time domain waveform. Additionally, interleaver 605 may also create additional quasi-orthogonal codes by using more than one interleaving pattern. An interleaver pattern index (produced by feedback resource controller 505) may replace the scrambling code index and a number of interleaver patterns (Ni) replaces Ns in equations (6)-(8) above.

Figure 7:
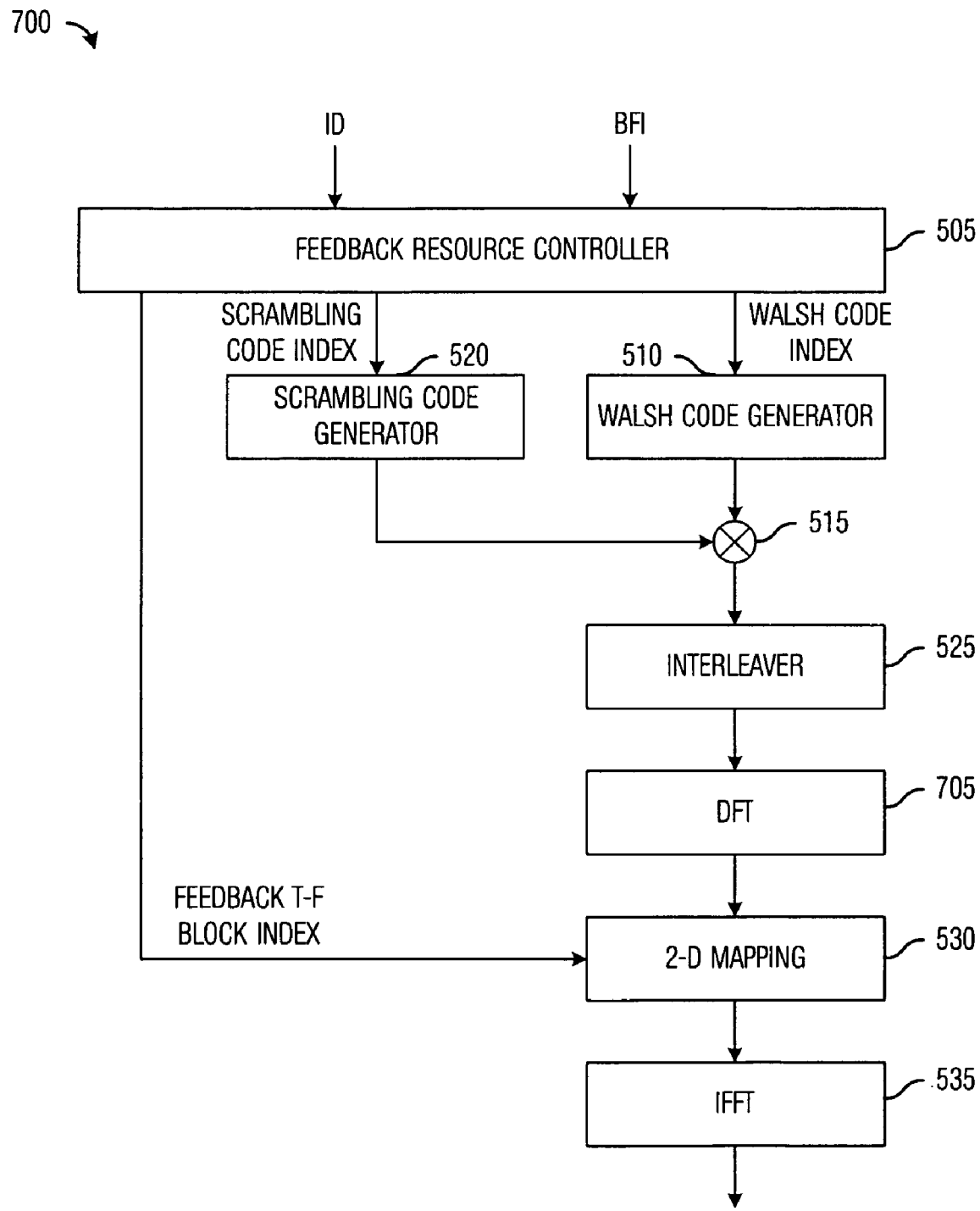
FIG. 7 is a diagram of a system for use in modulating and encoding beamforming index (BFI) feedback information for transmission to a BS.

FIG. 7 is a diagram of a system for use in modulating and encoding BFI feedback information for transmission to a BS. System 700 includes a discrete Fourier transform (DFT) element 705, to implement a Fourier transform, such as a discrete Fourier transform, to output an orthogonal or quasi-orthogonal sequence that may be spread over both dimensions of the basic feedback time-frequency resource block prior to IFFT element 535.

As it may be possible that the feedforward information provided by the BS to the MS may contain errors, the MS may erroneously compute the number of BFI bits that it needs to feedback to the BS when locating the feedback resource or sequences for BFI feedback. As a result, its BFI feedback may be mistaken by the BS as the BFI feedback of another MS. To help prevent this from taking place, if the MS misses the detection of the feedforward information sent by the BS, the MS may cease to send the BFI feedback until it acquires a subsequent and valid feedforward information from the BS.

Figures 8A, 8B:
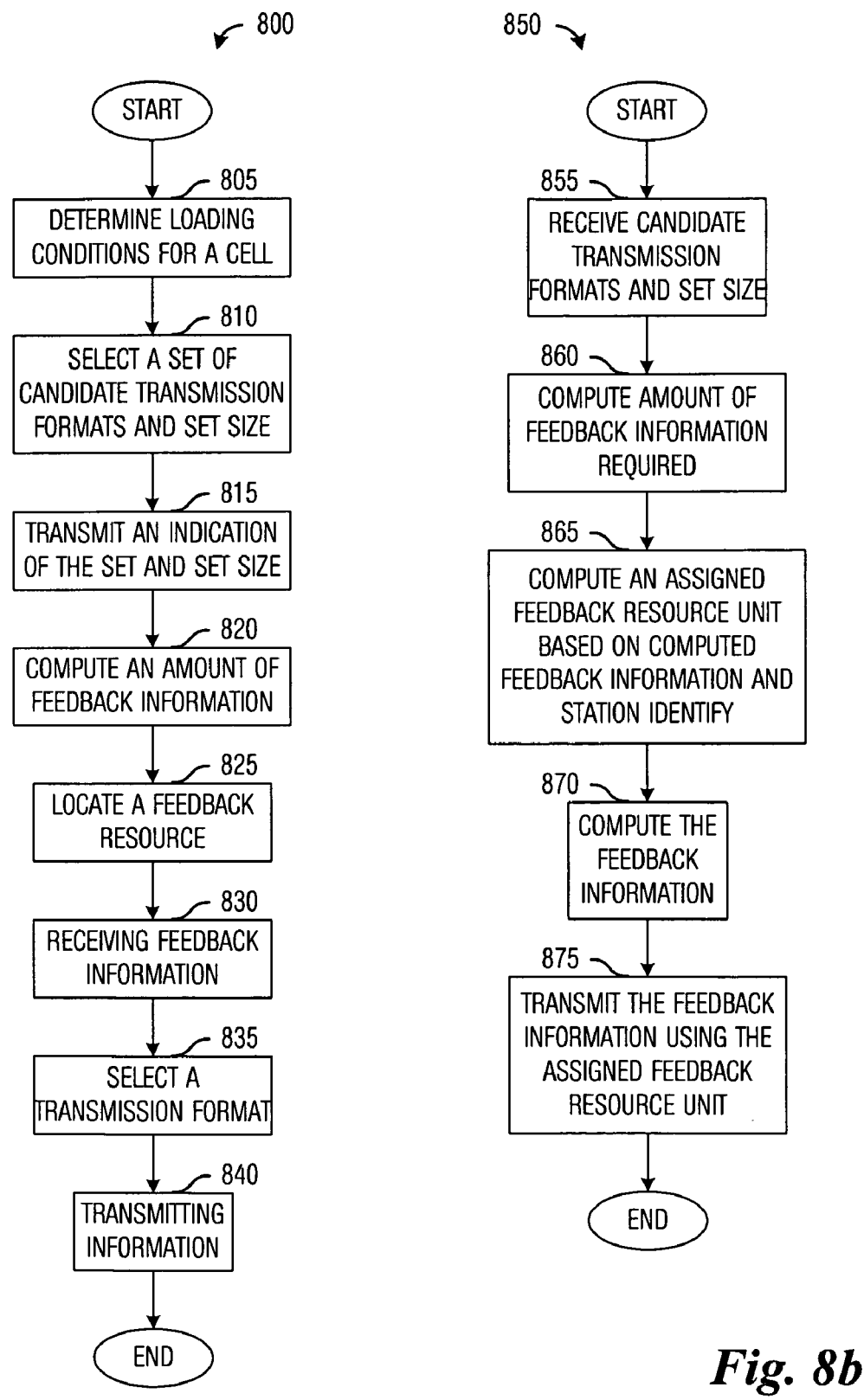
FIG. 8a is a flow diagram of the operations in a BS for configuring the transmitting of feedback information by a MS.
FIG. 8b is a flow diagram illustrating the operations in a MS for transmitting feedback information to a BS.

FIG. 8a is a flow diagram 800 illustrating the operations in a BS for transmitting information to a MS (such as beamforming enabled MS) operating in a cell. The configuring of the transmitting of feedback information by a MS may occur periodically in a BS, such as prior to the occurrence of a subsequent scheduling period. Alternatively, the configuring may occur when an event is detected. For example, the configuring may occur when a detected error rate, such as bit-error rate, frame-error rate, retransmission rate, and so forth, meets a specified threshold.

The operating may begin with the BS determining loading conditions for the cell (block 805). The loading conditions for the cell may include factors such as a number of MS operating in the cell, the buffer states of the MS operating in the cell, and so forth. Then, the BS may select a set of candidate transmission formats and set size (block 810). The selection of the set of candidate transmission formats includes selecting the set of candidate transmission formats from a set of possible transmission formats using the loading conditions of the cell and determining the size of the set of candidate transmission formats. Furthermore, the BS may identify each candidate transmission format in the set of candidate transmission formats.

Additionally, the selection of the set of candidate transmission formats may involve determining one or more thresholds of loading conditions for the cell, comparing the loading condition for the cell against the thresholds and then increasing or decreasing the set of candidate transmission formats based on the comparison. This may allow for an adaptive change in the set of candidate transmission formats based on the loading conditions for the cell. In addition to changing the set of candidate transmission formats based on loading conditions for the cell, the candidate transmission formats may be changed independent of loading conditions. The changes to the set of candidate transmission formats may occur periodically or when an event, such as a measured error rate, performance rate, or so on, occurs or meets a specified value.

The BS may then provide an indication of the set of candidate transmission formats and the set size to the MS (block 815). Typically, this may be performed by transmitting an indication (or representation) of the set of candidate transmission formats and the set size to the MS. Furthermore, in an alternative embodiment, the BS may provide a configuration of the set of candidate transmission formats rather than the set of candidate transmission formats. The BS may also compute an amount of feedback information that it is expecting from the MS (block 820). The amount of feedback information may be computed from the indication, for example. The BS may also locate feedback resource blocks for the MS (block 825). As discussed previously, the feedback resource blocks may be located using the amount of feedback information and an identifier (ID) for the MS, for example.

After the BS transmits the indication to the MS (block 815), the BS waits for feedback information transmitted by MS operating in the cell (block 830). The BS may be able to receive feedback information from the MS using the located feedback resource blocks found in block 825. The BS may make use of the received feedback information to select a transmission format from the set of candidate transmission formats (block 835) and transmit information to the MS using the selected transmission format (block 840). The operating may then terminate.

FIG. 8b is a flow diagram 850 illustrating the operations in a MS (such as a beamforming enabled MS) for transmitting feedback information to a BS. The transmitting of feedback information by a MS may occur when a MS detects an indication transmitted by a BS. Alternatively, the transmitting of feedback information by a MS may occur periodically (such as prior to the occurrence of a subsequent scheduling period) or when an event is detected. For example, the transmitting may occur or when a detected error rate meets a specified threshold.

The transmitting may begin when the MS receives an indication of a set of candidate transmission formats and a set size (or when some other specified event occurs or periodically) (block 855). From the indication of the set of candidate transmission formats and the set size, the MS may compute an amount of feedback information that it may be required to transmit to the BS (block 860). For example, referencing Figure 1a, if the indication of the set of candidate transmission formats and sizes reports that there may be three candidate beam sets with two beam streams per beam set, then the MS may compute that it may need to transmit three bits of feedback information to the BS. Alternatively, the indication may provide information regarding a configuration of the set of candidate transmission formats.

The MS may then compute its assigned feedback resource unit (block 865). The MS may compute its assigned feedback resource unit based on the computed amount of feedback information and its assigned identity (ID). For example, the MS may compute a beginning point of its assigned feedback resource unit using an expression expressible as:

$$\text{beginning point} = \text{feedback resource unit starting point} + (N-1)*\text{size of feedback resource unit,}$$

and an ending point of its assigned feedback resource unit using an expression expressible as:

$$\text{ending point} = \text{feedback resource unit starting point} + (N)*\text{size of feedback resource unit,}$$

where feedback resource unit starting point is the starting point of time and/or frequency domain resources allocated for use in transmitting the feedback information, N is the ID assigned to the MS, and size of feedback resource unit is the number of bits in the feedback information.

With the assigned feedback resource unit computed (block 865), the MS may then compute the information that it may feedback to the BS (block 870). The information that may feedback to the BS may be the best beam set and beam stream that it is able to detect. For example, the MS may be able to detect several beam sets. The MS may then select the beam set and beam stream that yields the highest signal strength, lowest interference, highest data rate, or so forth. The MS may then transmit the information back to the BS using the assigned feedback resource unit (block 875). The transmitting of the information back to the BS may also include setting a modulation and encoding scheme based on the amount of feedback information as well as setting a transmit power. The transmitting may then terminate.

Figure 9A:
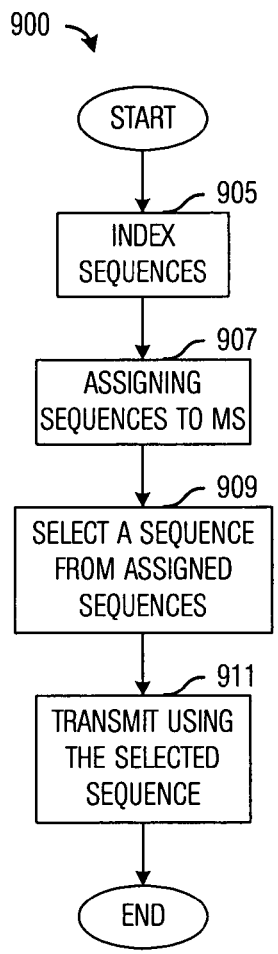
FIG. 9a is a flow diagram illustrating the operations in a MS for transmitting feedback information to a BS.

FIG. 9a is a flow diagram 900 illustrating the operations in a MS for transmitting feedback information to a BS. The BS and the MS may be operating in a wireless communications system with time and frequency domain resources that may be shared among a number of MS using different spreading sequences to spread the feedback information over the same bandwidth, such as in a CDM-OFDMA wireless communications network. The transmitting may be an implementation of block 875 of FIG. 8*b*, transmitting the feedback information to the BS.

The transmitting includes indexing a set of all possible spreading sequences (block 905) and then selecting from the indexed set of all possible spreading sequences, selecting a set of spreading sequences that may be usable by the MS for transmitting the feedback information (block 907). The set of spreading sequences may be selected from the set of all possible spreading sequences based on the identity (ID) of the MS (as assigned by the BS) and the amount of feedback information that may be transmitted to the BS.

From the set of spreading sequences selected from the set of all possible spreading sequences, a spreading sequence may be selected for use by the MS to spread the feedback information to the BS (block 909). The selected spreading sequence may be selected based on factors such as the value of the feedback information being transmitted to the BS. The selected spreading sequence may then be used to transmit the feedback information, which may include spreading the feedback information with the selected spreading sequence (block 911). Once the feedback information has been transmitted, the transmitting may terminate.

Figure 9B:
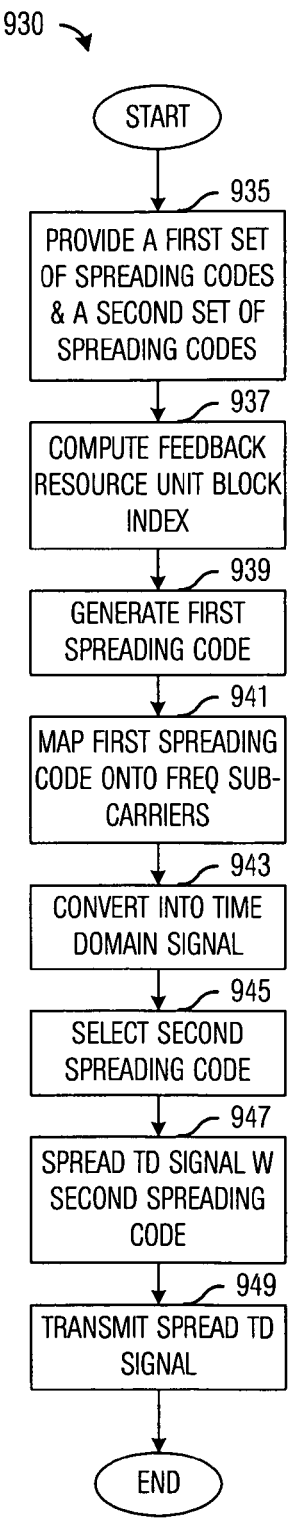
FIG. 9b is a flow diagram illustrating the operations in a MS for transmitting feedback information to a BS.

FIG. 9*b* is a flow diagram 930 illustrating the operations in a MS for transmitting feedback information to a BS. The BS and the MS may be operating in a wireless communications system with time and frequency domain resources that may be shared among a number of MS using different spreading sequences to spread the feedback information over the same bandwidth, such as in a CDM-OFDMA wireless communications network. The transmitting may be an implementation of block 875 of FIG. 8*b*, transmitting the feedback information to the BS.

The transmitting includes providing a first set of spreading codes and a second set of spreading codes, with the first set of spreading codes being frequency domain spreading codes and the second set of spreading codes being time domain spreading codes (block 935). The first set of spreading codes and the second set of spreading codes may be pre-defined, such as by a technical standard, and stored in the MS. The MS may then compute an index to the feedback resource unit block (block 937). The index to the feedback resource unit block may be based on factors such as the identity (ID) of the MS, the value of the feedback information, and so forth.

The MS may then generate a first spreading code (block 939). The first spreading code may be based on a spreading code from the first set of spreading codes and may be a frequency domain spreading code. The first spreading code may also be generated based on the identity (ID) of the MS, the value of the feedback information, and so on. The first spreading code may be generated from the spreading code from the first set of spreading codes by cyclic shifts, for example. Then, using the feedback resource unit block, the first spreading code may be mapped onto frequency sub-carriers (block 941) and an inverse Fourier transform, such as an inverse Fast Fourier transform (IFFT), may be used to convert the frequency domain signal (the frequency sub-carriers with the mapped first spreading code) into a time domain signal (block 943).

A second spreading code from the second set of spreading codes may be selected (block 945). The second spreading code may be selected based on the identity (ID) of the MS, the value of the feedback information, and so on. The second spreading code may be used to spread the time domain signal (block 947), which may then be transmitted to the BS (block 949). The transmitting may then terminate.

Figure 9C:
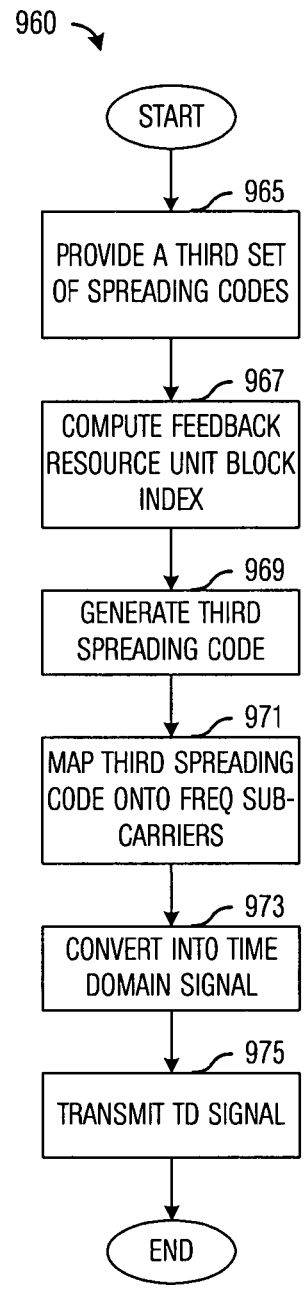
FIG. 9c is a flow diagram illustrating the operations in a MS for transmitting feedback information to a BS.

FIG. 9*c* is a flow diagram 960 illustrating the operations in a MS for transmitting feedback information to a BS. The BS and the MS may be operating in a wireless communications system with time and frequency domain resources that may be shared among a number of MS using different spreading sequences to spread the feedback information over the same bandwidth, such as in a CDM-OFDMA wireless communications network. The transmitting may be an implementation of block 875 of FIG. 8*b*, transmitting the feedback information to the BS.

The transmitting includes providing a third set of spreading codes (block 965) and determining an index to the feedback resource unit block (block 967). The index to the feedback resource unit block may be based on factors such as the identity (ID) of the MS, the value of the feedback information, and so forth. From the third set of spreading codes, a third spreading code may be generated (block 969). The third spreading code may be based on a spreading code from the third set of spreading codes. The third spreading code may also be generated based on the identity (ID) of the MS, the value of the feedback information, and so on.

Then, using the feedback resource unit block, the third spreading code may be mapped onto frequency sub-carriers (block 971) and an inverse Fourier transform, such as an inverse Fast Fourier transform (IFFT), may be used to convert the frequency domain signal (the frequency sub-carriers with the mapped first spreading code) into a time domain signal (block 973). The time domain signal may then be transmitted (block 975) and the transmitting may terminate.

Figure 10:
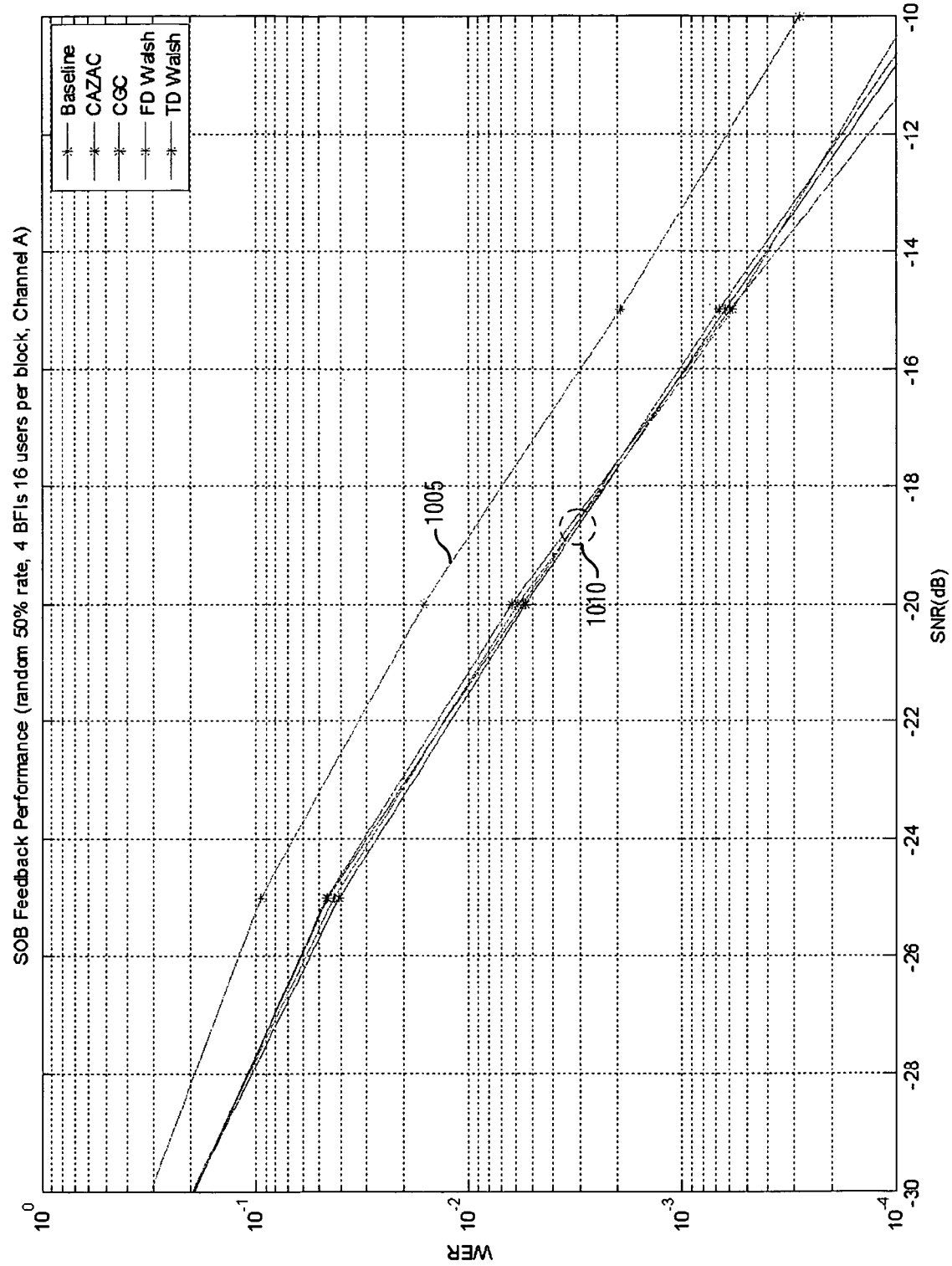
FIG. 10 is a data plot of word error rate (WER) versus signal to noise ratio (SNR) for a variety of feedback transmission techniques.

FIG. 10 is a data plot illustrating word error rate (WER) versus signal to noise ratio (SNR) for a variety of feedback transmission techniques. The embodiments' WER versus SNR performance were measured through simulation techniques with common assumptions such as: a five MHz channel bandwidth with a sub-carrier spacing of 9.6 kHz; a time-frequency block of size–12 sub-carriers×6 OFDM symbols; 16 simultaneous users; 4 streams; and 50% random BFI reporting. A baseline system that is purely OFDMA is used for comparison purposes.

A first curve 1005 represents the performance of the baseline system and a group of curves 1010 represents the performance of various embodiments, including embodiments utilizing CAZAC, CGC, TD Walsh, and FD Walsh codes. The performance of the various embodiments (shown as group of curves 1010) may indicate that the various embodiments provide substantially similar performance, which is better than the baseline system for all SNRs.

Figure 11:
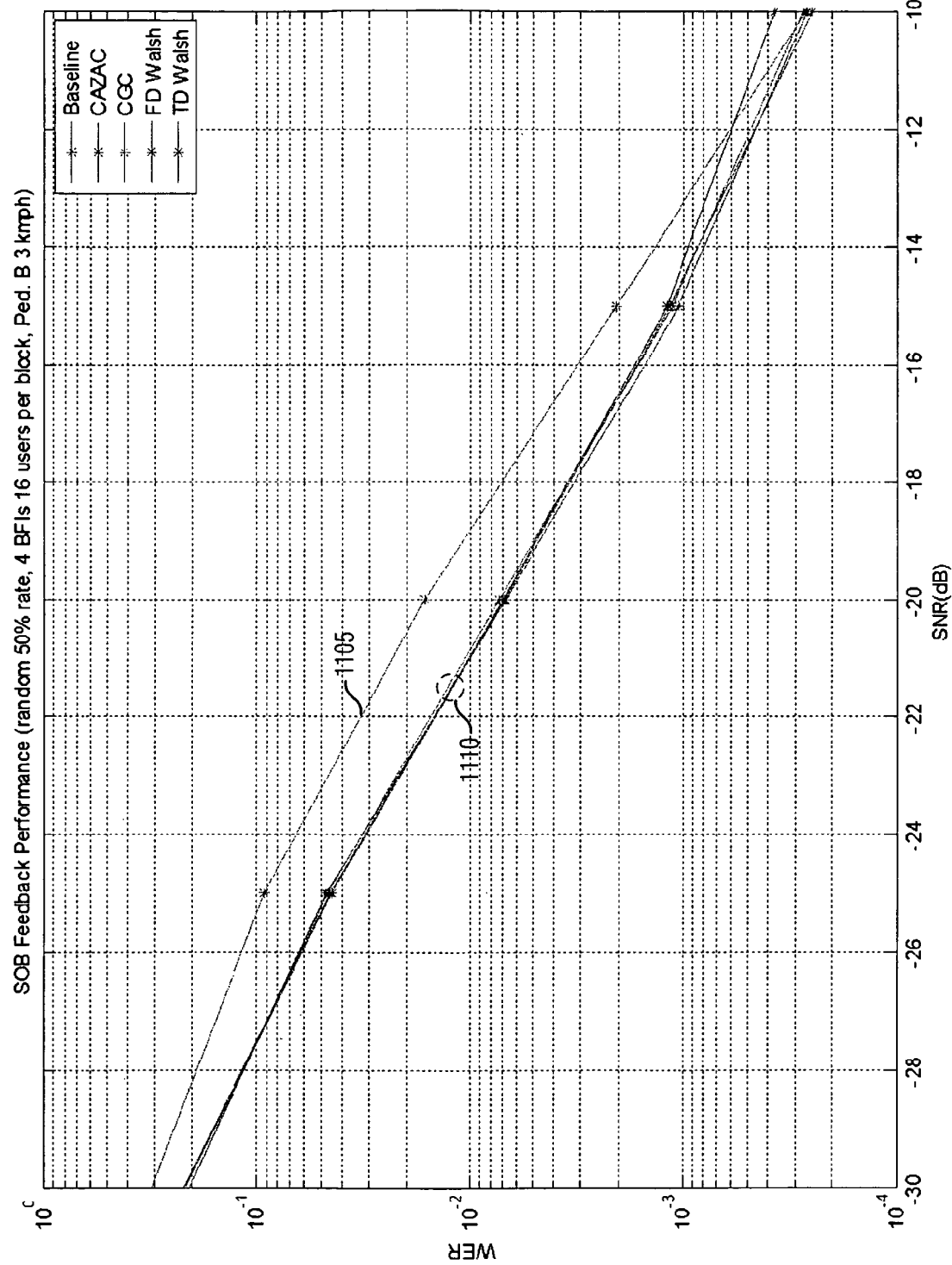
FIG. 11 is a data plot of word error rate (WER) versus signal to noise ratio (SNR) for a variety of feedback transmission techniques.

FIG. 11 is a data plot illustrating word error rate (WER) versus signal to noise ratio (SNR) for a variety of feedback transmission techniques. The embodiments' WER versus SNR performance were measured through simulation techniques with common assumptions such as: a five MHz channel bandwidth with a sub-carrier spacing of 9.6 kHz; a time-frequency block of size–12 sub-carriers×6 OFDM symbols; 16 simultaneous users; 4 streams; 50% random BFI reporting; and pedestrian motion model. A baseline system that is purely OFDMA is used for comparison purposes.

A first curve 1105 represents the performance of the baseline system and a group of curves 1010 represents the performance of various embodiments, including embodiments utilizing CAZAC, CGC, TD Walsh, and FD Walsh codes. The performance of the various embodiments (shown as group of curves 1110) may indicate that the various embodiments provide substantially similar performance, which is better than the baseline system for all but the highest SNRs.

Figure 12:
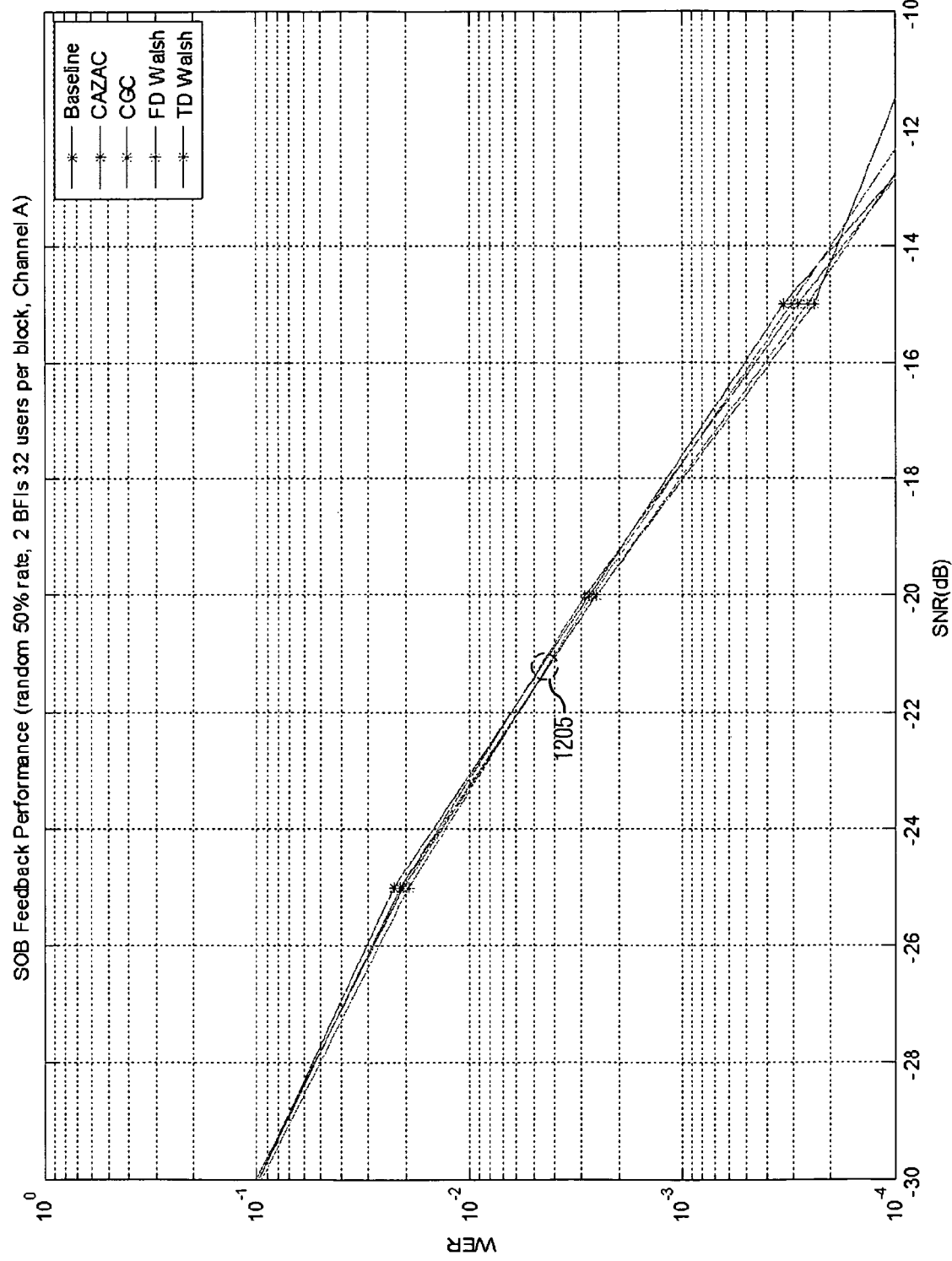
FIG. 12 is a data plot of word error rate (WER) versus signal to noise ratio (SNR) for a variety of feedback transmission techniques.

FIG. 12 is a data plot illustrating word error rate (WER) versus signal to noise ratio (SNR) for a variety of feedback transmission techniques. The embodiments' WER versus SNR performance were measured through simulation techniques with common assumptions such as: a five MHz channel bandwidth with a sub-carrier spacing of 9.6 kHz; a time-frequency block of size–12 sub-carriers×6 OFDM symbols; 32 simultaneous users; 2 streams; and 50% random BFI reporting. A baseline system that is purely OFDMA is used for comparison purposes.

A group of curves 1205 represents the performance of the baseline system and of the various embodiments, including embodiments utilizing CAZAC, CGC, TD Walsh, and FD Walsh codes. The simulation results show that the baseline system and the various embodiments offer similar performance in situations with large numbers of users and small number of feedback streams.

Figure 13:
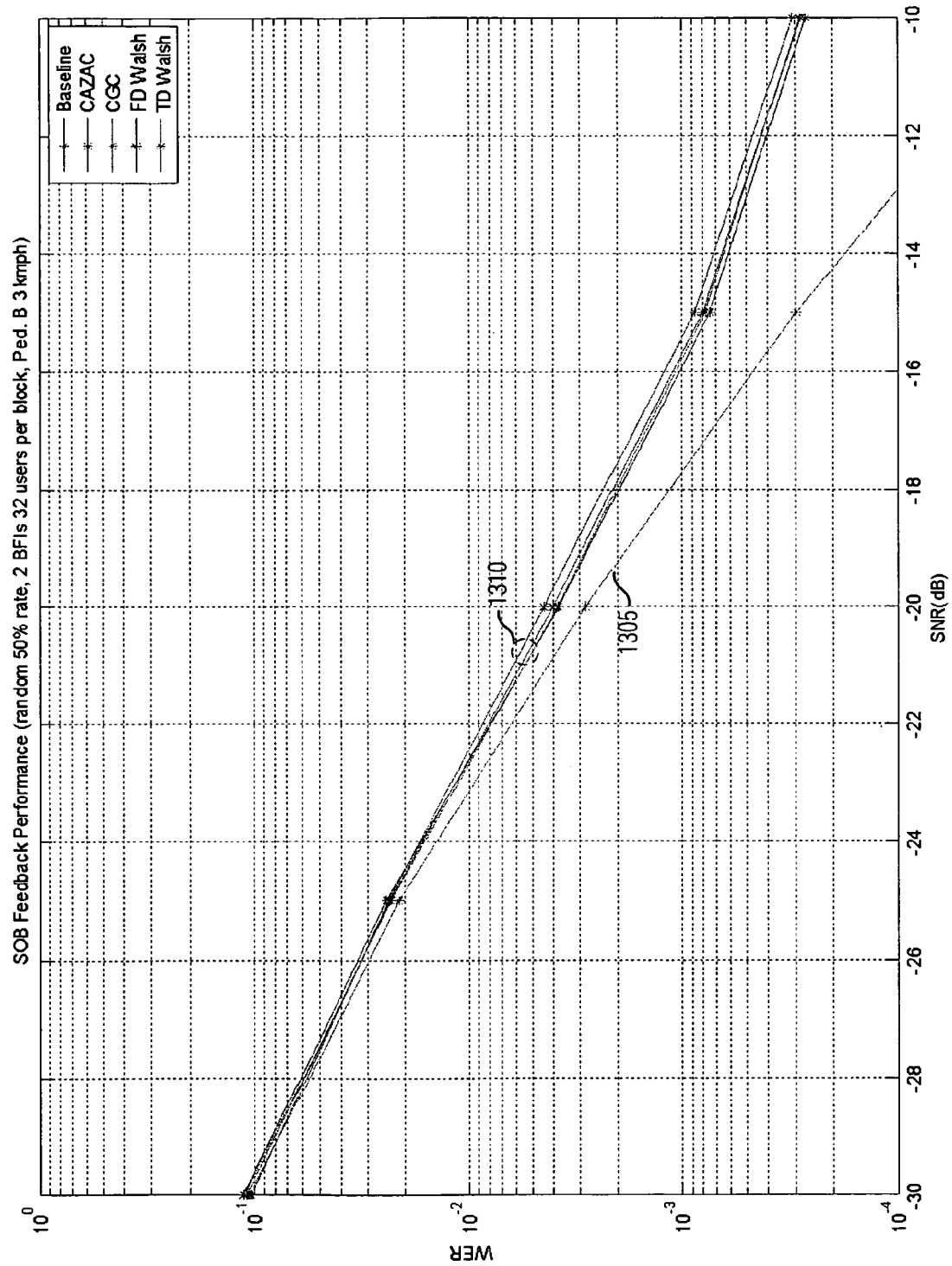
FIG. 13 is a data plot of word error rate (WER) versus signal to noise ratio (SNR) for a variety of feedback transmission techniques.

FIG. 13 is a data plot illustrating word error rate (WER) versus signal to noise ratio (SNR) for a variety of feedback transmission techniques. The embodiments' WER versus SNR performance were measured through simulation techniques with common assumptions such as: a five MHz channel bandwidth with a sub-carrier spacing of 9.6 kHz; a time-frequency block of size–12 sub-carriers×6 OFDM symbols; 32 simultaneous users; 2 streams; 50% random BFI reporting; and pedestrian motion model. A baseline system that is purely OFDMA is used for comparison purposes.

A first curve 1305 represents the performance of the baseline system and a group of curves 1310 represents the performance of various embodiments, including embodiments utilizing CAZAC, CGC, TD Walsh, and FD Walsh codes. The performance of the various embodiments (shown as group of curves 1310) may indicate that with severe multipath fading, user interference creates a higher error floor.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a mobile station in a cell of a wireless communications system, the method comprising:
   receiving an indication from a base station, wherein the indication comprises information related to a set of candidate transmission formats and a size of the set, and wherein the size of the set is based on loading conditions in the cell;
   computing, by the mobile station, an amount of feedback information to transmit back to the base station based on the information in the indication, wherein the amount of feedback information corresponds to a number of feedback information bits to transmit in an uplink channel of the wireless communications system;
   locating a feedback resource assigned to the mobile station based on the amount of feedback information and an identity of the mobile station;
   computing feedback information related to a preferred transmission format, wherein the preferred transmission format is selected from the set of candidate transmission formats; and
   transmitting the feedback information using the located feedback resource.

2. The method of claim 1, wherein the set of candidate transmission formats comprises beam sets and beam streams for each beam set for beamforming using multiple transmit antennas, wherein the feedback information comprises a preferred beam set and a preferred beam stream, and wherein the preferred beam set and the preferred beam stream comprise a beamforming precoding matrix index.

3. The method of claim 1, further comprising:
   setting a modulation and encoding scheme based on the amount of feedback information; and
   setting a transmit power.

4. The method of claim 1, wherein the feedback resource is assigned to a plurality of mobile stations, and wherein different spreading sequences are used to facilitate the sharing of the feedback resource by the plurality of mobile stations.

5. The method of claim 4, wherein the transmitting comprises:
   indexing the spreading sequences;
   assigning a subset of the spreading sequences to the mobile station, wherein the assigning is based on the identity of the mobile station and the amount of feedback information;
   selecting a spreading sequence from the subset of spreading sequences; and
   transmitting the feedback information using the selected spreading sequence.

6. The method of claim 5, wherein the transmitting further comprises:
   receiving a set of third spreading sequences;
   computing a second feedback resource block index based on the identity of the mobile station and the value of the feedback information;
   generating a third spreading code from the set of third spreading sequences;
   mapping the third spreading code onto frequency sub-carriers to produce a second frequency domain signal, wherein the mapping is based on the second feedback resource block index;
   converting the second frequency domain signal into a second time domain signal; and
   transmitting the second time domain signal.

7. The method of claim 6, further comprising, prior to the mapping the third spreading code, interleaving the generated third spreading code.

8. The method of claim 7, further comprising, prior to the interleaving, scrambling the generated third spreading code.

9. The method of claim 8, further comprising, prior to the mapping the third spreading code, converting the scrambled and interleaved generated third spreading code into a third frequency domain signal.

10. The method of claim 4, wherein the transmitting comprises:
    receiving a set of first spreading sequences, wherein the set of first spreading sequences comprises frequency domain spreading sequences;

receiving a set of second spreading sequences, wherein the set of second spreading sequences comprises time domain spreading sequences;

computing a feedback resource block index based on the identity of the mobile station and the value of the feedback information;

generating a first spreading code from the set of first spreading sequences, wherein the generating is based on the identity of the mobile station and the value of the feedback information;

mapping the first spreading code onto frequency sub-carriers to produce a frequency domain signal, wherein the mapping is based on the feedback resource block index;

converting the frequency domain signal into a time domain signal;

selecting a second spreading code from the set of second spreading sequences, wherein the selecting is based on the identity of the mobile station and the value of the feedback information;

spreading the time domain signal with the second spreading code; and transmitting the spread time domain signal.

11. The method of claim 10, wherein the set of first spreading sequences is constant amplitude and zero-autocorrelation codes (CAZAC), computer generated codes (CGC) that meet specified peak to average power ratio (PAPR) and auto-correlation and cross-correlation properties, or Walsh codes.

12. The method of claim 10, wherein the set of second spreading sequences is Walsh codes, or sequences in a Fourier matrix.

13. A mobile station operating in a cell of a wireless communications system having a base station and a mobile station, the mobile station comprising:

a processor; and a computer readable storage medium storing programming for execution by the processor, the programming including instructions to:

receive an indication comprising information from the base station, wherein the information is related to a set of candidate transmission formats for transmitting a data packet from the base station to the mobile station and a size of the set, and wherein the indication is based on loading conditions in the cell;

compute an amount of feedback information to transmit back to the base station based on the indication, wherein the amount of feedback information corresponds to a number of feedback information bits to transmit in an uplink channel of the wireless communications system;

locate a feedback resource assigned to the mobile station based on the amount of feedback information and an identity of the mobile station;

compute feedback information, wherein the feedback information is related to a preferred transmission format that is selected from the set of candidate transmission formats; and transmit the feedback information using the located feedback resource.

14. The mobile station of claim 13, wherein the programming further includes instructions to:

set a modulation and encoding scheme based on the amount of feedback information; and set a transmit power.

15. The mobile station of claim 13, wherein the programming further includes instructions to:

determine a validity of the indication;

stop the transmission of the feedback information when the indication is invalid; and resume the transmission of the feedback information when the invalid indication is replaced with a new indication that is received correctly.

16. The mobile station of claim 13, wherein the feedback resource is assigned to a group of mobile stations that includes the mobile station, wherein different spreading sequences are used to facilitate the sharing of the feedback resource by the plurality of mobile stations, wherein the spreading sequences are indexed, wherein a subset of the spreading sequences are assigned to the mobile station based on the identity of the mobile station and the amount of feedback information, and wherein the programming further includes instructions to:

select a spreading sequence from the subset of spreading sequences;

transmit the feedback information using the selected spreading sequence;

receive a set of third spreading sequences;

compute a second feedback resource block index based on the identity of the mobile station and the value of the feedback information;

generate a third spreading code from the set of third spreading sequences;

map the third spreading code onto frequency sub-carriers to produce a second frequency domain signal, wherein the mapping is based on the second feedback resource block index;

convert the second frequency domain signal into a second time domain signal; and transmit the second time domain signal.

17. The mobile station of claim 16, wherein the programming further includes instructions to interleave the generated third spreading code prior to the mapping the third spreading code.

18. The mobile station of claim 17, wherein the programming further includes instructions to scramble the generated third spreading code prior to interleaving the generated third spreading code.

19. The mobile station of claim 18, wherein the programming further includes instructions to convert the scrambled and interleaved generated third spreading code into a third frequency domain signal prior to the mapping the third spreading code.

20. A method for operating a base station in a cell of a wireless communications system, the method comprising:

computing a loading condition in the cell;

selecting a set of candidate transmission formats for transmitting information, wherein the selecting is based on the loading condition;

transmitting an indication of the set of candidate transmission formats and a size of the set to a mobile station in the cell;

computing an expected amount of feedback information transmitted by the mobile station, wherein the expected amount of feedback information is based on the indication, and wherein the expected amount of feedback information corresponds to an expected number of feedback information bits to receive in an uplink channel of the wireless communications system;

locating a feedback resource for the mobile station, wherein the feedback resource is located using an identifier of the mobile station and the expected amount of feedback information;

receiving feedback information from the mobile station;

selecting a transmission format from the set of candidate transmission formats, wherein the selecting is based on the feedback information; and transmitting information to the mobile station using the selected transmission format.

21. The method of claim 20, wherein the selecting a set of candidate transmission formats is further based on the occurrence of an event, and wherein the event comprises the loading condition in the cell exceeding a threshold, or the expiration of a specified time duration.

22. A base station operating in a cell of a wireless communications system including a mobile station, the base station comprising:

means for determining a loading condition in the cell;

means for selecting a set of candidate transmission formats for transmitting a data packet to the mobile station based on the loading condition in the cell;

means for indicating the set of candidate transmission formats to the mobile station;

means for computing an amount of feedback information that the mobile station transmits back based on the set of candidate transmission formats, wherein the amount of feedback information corresponds to a number of feedback information bits to be communicated by the mobile station in an uplink channel of the wireless communications system;

means for locating a feedback resource that the mobile station uses for transmitting a feedback information based on the amount of feedback information and an identity of the mobile station;

means for receiving feedback information using the feedback resource;

means for selecting a transmission format from the set of candidate transmission formats using the feedback information; and means for transmitting the data packet according to the selected transmission format.

23. The base station of claim 22, wherein the means for receiving the feedback information further comprises means for demodulating and decoding the feedback information according to a modulation and encoding scheme based on the amount of feedback information.

24. The base station of claim 22, wherein the means for selecting a set of candidate transmission formats further comprises:

means for determining a threshold for the loading conditions of the cell;

means for increasing the size of the set when the loading conditions of the cell are above the threshold; and means for decreasing the size of the set when the loading conditions of the cell are below the threshold.

25. The base station of claim 22, wherein the means for selecting a set of candidate transmission formats further comprises means for changing the candidate transmission formats within the set of candidate transmission formats at the expiration of a specified time duration.

26. A base station operating in a cell of a wireless communications system, the base station comprising:

a processor; and a computer readable storage medium storing programming for execution by the processor, the programming including instructions to:

determine a loading condition in the cell;

select a set of candidate transmission formats for transmitting a data packet to a mobile station based on the loading condition in the cell;

indicate a set of candidate transmission formats to the mobile station;

compute an amount of feedback information that the mobile station transmits back based on the set of candidate transmission formats, wherein the amount of feedback information corresponds to a number of feedback information bits to be communicated by the mobile station in an uplink channel of the wireless communications system;

locate a feedback resource that the mobile station uses for transmitting a feedback information based on the amount of feedback information and an identity of the mobile station;

receive feedback information using the feedback resource;

select a transmission format from the set of candidate transmission formats using the feedback information; and transmit the data packet according to the selected transmission format.

* * * * *